United States Patent
Eaton et al.

(10) Patent No.: US 6,617,036 B2
(45) Date of Patent: Sep. 9, 2003

(54) BARRIER LAYER FOR SILICON CONTAINING SUBSTRATE

(75) Inventors: Harry E. Eaton, Woodstock, CT (US); John E. Holowczak, South Windsor, CT (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 10/034,035

(22) Filed: Dec. 19, 2001

(65) Prior Publication Data

US 2003/0113559 A1 Jun. 19, 2003

(51) Int. Cl.⁷ .............. B32B 9/04; F03B 13/12
(52) U.S. Cl. ............ 428/446; 428/697; 428/698; 428/699; 428/701; 428/702; 428/448; 416/241 B
(58) Field of Search ............. 428/469, 408, 428/698, 699, 701, 702, 697, 446, 448, 660, 680, 681; 416/241 B, 241 R

(56) References Cited

U.S. PATENT DOCUMENTS 4,485,179 A * 11/1984 Brennan et al.
5,851,678 A * 12/1998 Hasz et al.
6,296,941 B1 * 10/2001 Eaton et al.
6,485,848 B1 * 11/2002 Wang et al.

FOREIGN PATENT DOCUMENTS

WO    WO 01/10795 A1    2/2001

* cited by examiner

*Primary Examiner*—Deborah Jones
*Assistant Examiner*—Jennifer McNeil
(74) *Attorney, Agent, or Firm*—Bachman & LaPointe, P.C.

(57) ABSTRACT

A barrier layer for a silicon containing substrate which inhibits the formation of gaseous species of silicon when exposed to a high temperature aqueous environment comprises a barium-strontium aluminosilicate includes an aluminosilicate of Group IIA and/or Group IIIB and a Group VB oxide.

31 Claims, No Drawings

BARRIER LAYER FOR SILICON CONTAINING SUBSTRATE

BACKGROUND OF THE INVENTION

The present invention relates to an article comprising a substrate containing silicon and a barrier layer which functions as a protective environmental/thermal barrier coating and, more particularly, a barrier layer which inhibits the formation of gaseous species of Si, particularly $Si(OH)_x$ when the article is exposed to a high temperature, aqueous (water and/or steam) environment.

Ceramic materials containing silicon and metal alloys containing silicon have been proposed for structures used in high temperature applications as, for example, gas turbine engines, heat exchangers, internal combustion engines, and the like. A particular useful application for these materials is for use in gas turbine engines which operate at high temperatures in combustion gas environments. It has been found that these silicon containing substrates can recede and lose mass as a result of a formation volatile Si species, particularly $Si(OH)_x$ and SiO when exposed to high temperature, combustion environments having water vapor as a product of combustion. For example, silicon carbide when exposed to a lean fuel combustion environment of approximately 1 ATM pressure of water vapor at 1200° C. will exhibit weight loss and recession at a rate of approximately 6 mils per 1000 hrs. It is believed that the process involves oxidation of the silicon carbide to form silica on the surface of the silicon carbide followed by reaction of the silica with steam to form volatile species of silicon such as $Si(OH)_x$. U.S patent application Ser. No. 09/292,349 filed Apr. 15, 1999, now U.S. Pat. No. 6,410,148 discloses a barrier layer for a silicon containing substrate which is effective in inhibiting the formation of volatile silicon species and thereby reduce recession and mass loss in the substrate. The barrier layers disclosed as useful are alkaline earth aluminum silicates. Particularly useful barrier layers include barium alumino silicates and barium strontium alumino silicates. While these barrier layers have been found to be particularly effective on silicon carbide substrates, it is expected that the barrier layers when applied to substrates containing silicon nitride may lead to cracking due to the differences in the coefficient of thermal expansion between the alkaline earth alumino silicates and silicon nitride.

Naturally it would be highly desirable to provide a external barrier coating for silicon containing substrates, including silicon nitrides which would inhibit the formation of volatile silicon species, $Si(OH)_x$ and SiO, and thereby reduce. recession and mass loss.

Accordingly, it is the principle object of the present invention to provide an article comprising a silicon containing substrate with a barrier layer which inhibits the formation of gaseous species of Si, particularly $Si(OH)_x$, when the article is exposed to a high temperature, aqueous environment, such as a gas turbine engine hot section.

A second objective of this invention is to provide an article comprising a substrate with a barrier layer providing thermal protection, such layer closely matching the thermal expansion of the substrate.

It is a further object of the present invention to provide a method for producing an article as aforesaid.

SUMMARY OF THE INVENTION

The present invention relates to an article comprising a silicon containing substrate having a barrier layer on the substrate, wherein the barrier layer functions to both inhibit the formation of undesirable gaseous species of silicon when the article is exposed to a high temperature, aqueous environment and to provide thermal protection. The term "high temperature" refers to the temperature range at which the Si in the substrate forms $Si(OH)_x$ and/or SiO in an aqueous environment. The term "aqueous environment" refers to a water and/or steam environment. The silicon containing composite is preferably a ceramic or metal alloy containing silicon including, but not limited to, silicon nitride, silicon carbide and Mo—Si alloys. The barrier layers in accordance with the present invention comprises an alkaline earth metal aluminosilicate and an oxide selected from tantalum oxide, niobium oxide and mixtures thereof. The addition of the oxide of Group VB to the barrier layer has a positive effect on the coefficient of thermal expansion (CTE) so as to make the barrier layer compatible with the silicon containing substrate, particularly, silicon nitrides. In a preferred embodiment.of the present invention the article can include one or more intermediate layers between the silicon based substrate and the barrier layer. The intermediate layer(s) serve(s) to provide enhanced adherence between the barrier layer and the substrate and/or to prevent reactions between the barrier layer and the substrate. In addition, the layers can serve to provide for transition between layers of different thermal expansion.

Further objects and advantages of the present invention will appear hereinbelow from the following detailed description.

DETAILED DESCRIPTION

The present invention relates to an article comprising a silicon containing substrate and a barrier layer, wherein the barrier layer inhibits the formation of gaseous species of silicon when the article is exposed to a high temperature, aqueous environment. While the barrier is particularly directed to an environmental barrier layer, the barrier layer also functions as a thermal barrier layer and thus the present invention broadly encompasses the use of environmental/thermal barrier layers on silicon containing substrates and on substrates having comparable thermal expansion coefficients.

According to the present invention, the silicon containing substrate may be a silicon containing ceramic substrate or a silicon containing metal alloy. In a preferred embodiment, the silicon containing substrate is a silicon containing ceramic material as, for example, silicon carbide, silicon nitride, Mo—Si alloys, silicon carbon nitride, silicon oxynitride and silicon aluminum oxynitride. In accordance with a particular embodiment of the present invention, the silicon containing ceramic substrate comprises a silicon containing matrix with reinforcing such as fibers, particles, and the like and, more particularly, a silicon based matrix which is fiber-reinforced. Particularly suitable ceramic substrates are a silicon carbide coated silicon carbide fiber-reinforced silicon carbide particle and silicon matrix, a carbon fiber-reinforced silicon carbide matrix and a silicon carbide fiber-reinforced silicon nitride matrix. Particularly useful silicon-metal alloys for use as substrates for the article of the present invention include molybdenum-silicon alloys, niobium-silicon alloys, and other Si containing alloys having a coefficient of thermal expansion compatible with the barrier layer of the present invention.

Barrier layers particularly useful in the article of the present invention include aluminosilicates of Group IIA and Group IIIB of the Periodic Table (CAS version) and an oxide of Group VB of the Periodic Table (CAS version) with barium aluminosilicates, barium-strontium aluminosilicates and yttrium aluminosilicates preferred. Preferred Group VB metals are tantalum and niobium and mixtures thereof which provide a high temperature thermal barrier and CTE compatibility. The aluminosilicate should be present in at least 25% by weight of the barrier layer and the Group VB (CAS version of Periodic Table) oxide should-likewise be present in at least 25% by weight of the barrier layer. The preferred barrier layer of the present invention comprises 25 to 75 wt. % of an oxide selected from the group consisting of Ta, Nb and mixtures thereof, with the balance a barrier material such as barium, strontium, aluminosilicate, and ideally 50 to 75 wt. % of the oxide.

It is an important feature of the present invention to maintain compatibility between the coefficient of thermal expansion of the silicon containing substrate and the barrier layer and between the barrier layer and any adjacent layer. In accordance with the present invention it has been found that the coefficient of thermal expansion of the barrier layer should be within ±3.0 ppm per degrees centigrade, preferably ±0.5 ppm per degrees centigrade, of the coefficient of thermal expansion of the silicon containing substrate. As disclosed in co-pending application Ser. No. 10/034,677, (Attorney Docket No. 01-367) filed concurrently herewith, CTE can be tailored using a CTE tailoring additive. The CTE tailoring additive is selected from the group consisting of $NbO_x$ and $NbO_x$ plus an oxide selected from the group consisting of MgO, CaO, SrO, BaO, $Al_2O_3$, $Y_2O_3$, $La_2O_3$, rare earth oxides and mixtures thereof where x=1 to 3 (for example NbO, $Nb_2O_3$, $Nb_2O_5$), where x is a ratio of 0 to the compound element (see U.S. Pat. No. 4,155,016). When the additive comprises $NbO_x$ with an oxide as set forth above, it may comprise the layer per se. In accordance with a preferred embodiment of the present invention, the CTE tailoring additive is added to a layer material for adjusting the CTE of the layer so as to make the layer compatible with the substrate and any other adjacent layers which may be employed.

In addition, as disclosed in co-pending application Ser. No. 10/033,955, filed concurrently herewith (Attorney Docket No 01-453), thermal protection is improved with the use of $TaO_x$ (where x=1 to 3), for example $Ta_2O_3$, as a portion of the barrier layer.

The barrier layer should be present in the article at a thickness of greater than or equal to about 0.5 mils (0.0005 inch), preferably between about 3 to about 30 mils and ideally between about 3 to about 5 mils. The barrier layer may be applied to the silicon based substrate by any suitable manner known in the art, however, it is preferable that the barrier layer be applied by thermal spraying as will be described hereinbelow.

In a further embodiment of the article of the present invention, an intermediate layer can be provided between the silicon containing substrate and the barrier layer. The intermediate layer(s) serve(s) to provide enhanced adhesion between the barrier layer and the substrate and/or to prevent reactions between the barrier layer and the substrate. The intermediate layer consists of, for example, $SiO_2$, mullite, mullite-barium strontium aluminosilicate, mullite-yttrium silicate, mullite-calcium aluminosilicate, and silicon metal. Mullite has been found to be a particularly useful intermediate layer; however, mullite by itself tends to be cracked as the result of thermal spray fabrication processing. Accordingly, it is preferred that the barrier layer comprises mullite-barium strontium aluminosilicate, mullite-yttrium silicate, or mullite-calcium aluminosilicate in an amount of between about 40 to 80 wt. % mullite and between about 20 to 60 wt. % barium strontium aluminosilicate or yttrium silicate or calcium aluminosilicate. The thickness of the intermediate layer is typical to those described above with regard to the barrier layer and the intermediate layer may likewise be disposed in any manner known in the prior art, however, preferably by thermal spraying as described hereinbelow.

In addition to the intermediate layer, a bond layer may be provided between the silicon containing substrate and the intermediate layer. A suitable bond layer includes silicon metal in a thickness of 3 to 6 mils. Alternatively, the silicon containing substrate may be pre-oxidized to provide a $SiO_2$ bond layer prior to application of the intermediate layer.

The method of the present invention comprises providing a silicon containing substrate and applying a barrier layer wherein.the barrier layer inhibits the formation of gaseous species of silicon when the article is exposed to a high temperature, aqueous environment. In accordance with the present invention it is preferred that the barrier layer be applied by thermal spraying. It has been found that the barrier layer should be thermal sprayed at a substrate temperature of between about 870° C. to 1200° C. in order to help equilibrate the as-sprayed, splat quenched, microstructure and to provide a means to manage stresses which control delamination. When the article being prepared in accordance with the method of the present invention is a silicon containing ceramic with a barium strontium aluminosilicate barrier layer, it is preferred that the barium strontium aluminosilicate barrier layer have celsian crystallographic structure in an amount of at least 50% by volume in the barrier layer. The formation of the celsian crystallographic structure insures compatibility between the coefficient of thermal expansion of the silicon containing ceramic and the barium strontium aluminosilicate barrier layer as described above.

The silicon containing substrate should be cleaned prior to application of the barrier layer to remove substrate fabrication contamination. It is preferred that the silicon based substrate be subjected to a grit blasting step prior to application of the barrier layer. The grit blasting step must be carried out carefully in order to avoid damage to the surface of the silicon-containing substrate such as silicon carbide fiber reinforced composite. It has been found that the particles used for the grit blasting should be hard enough to remove the undesired contamination but not as hard as the substrate material to prevent erosive removal of the substrate. Further, the particles must be small to prevent impact damage to the substrate. When processing an article comprising a silicon carbide ceramic composite substrate, it has been found that the grit blasting should be carried out with $Al_2O_3$ particles, preferably of a particle size of $\leq 30$ microns and, preferably, at a velocity of about 150 to 200 m/sec. In addition to the foregoing, it may be particularly useful to preoxidize the silicon based substrate prior to application of the intermediate and/or barrier layer in order to improve adherence. It has been found that bond layers of between 100 nanometers to 2000 nanometers are preferred. $SiO_2$ bond layers of the desired thickness can be achieved by preoxidizing the silicon-carbide substrate at a temperature of between 800° C. to 1200° C. for about 15 minutes to 100 hours.

The silicon bond layer may be applied directly to the grit blasted surface by thermal spraying at approximately 870° C. to a thickness of 3 to 6 mils.

Intermediate layers may be applied between the substrate and/or bond layer and the barrier layer or between the bond layer and barrier layer by thermal spraying in the same manner described above with respect to the barrier layer. As noted above, the preferred intermediate layers include mullite, mullite-barium strontium aluminosilicate, mullite-yttrium silicate, and mullite-calcium aluminosilicate.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An article comprising:
   a substrate comprising silicon; and
   a barrier layer comprising an aluminosilicate selected from the group consisting of Group IIA, Group IIIB and mixtures thereof, and further comprising an oxide selected from Group VB, wherein the barrier layer inhibits the formation of gaseous species of Si when the article is exposed to a high temperature, aqueous environment.

2. An article according to claim 1 wherein the substrate is selected from the group consisting of silicon containing ceramic and metal alloys containing silicon.

3. An article according to claim 2 wherein the substrate is a silicon containing ceramic selected from the group consisting of silicon carbide, silicon nitride, and silicon aluminum oxynitride.

4. An article according to claim 2 wherein the substrate is a composite comprising a silicon based matrix and a reinforcing particle.

5. An article according to claim 4 wherein said substrate is selected from the group consisting of silicon carbide fiber-reinforced silicon carbide matrix, carbon fiber-reinforced silicon carbide matrix and silicon carbide fiber-reinforced silicon nitride.

6. An article according to claim 2 wherein said substrate is a silicon containing metal alloy selected from the group consisting of molybdenum-silicon alloys, niobium silicon alloys, iron-silicon alloys, and iron-nickel-silicon based alloys.

7. An article according to claim 1 wherein the barrier layer comprises an aluminosilicate selected from the group consisting of barium aluminosilicate, barium strontium aluminosilicate, yttrium aluminosilicate and mixtures thereof, and further comprising an oxide selected from the group consisting of tantalum oxide, niobium oxide and mixtures thereof.

8. An article according to claim 7 wherein the barrier layer comprises from 25 to 75 wt. % of the oxide selected from the group consisting of Ta, Nb and mixtures thereof.

9. An article according to claim 7 wherein the barrier layer comprises from 50 to 75 wt. % of the oxide selected from the group consisting of Ta, Nb and mixtures thereof.

10. An article according to claim 1 wherein the at least 25% by wt. of the aluminosilicate and at least 25% by wt. the oxide.

11. An article according to claim 1 wherein the barrier layer comprises from 25 to 75 wt. % of the oxide selected from the group consisting of Ta, Nb and mixtures thereof.

12. An article according to claim 1 wherein the barrier layer comprises from 50 to 75 wt. % of the oxide selected from the group consisting of Ta, Nb and mixtures thereof.

13. An article according to claim 1 wherein the barrier layer comprises the oxide selected from the group consisting of Ta, Nb and mixtures thereof and the aluminosilicate selected from the group consisting of barium, strontium and mixtures thereof.

14. An article according to claim 13 wherein the barrier layer comprises 25 to 75 wt. % of the oxide, balance the aluminosilicate.

15. An article according to claim 1 wherein the coefficient of thermal expansion of the barrier layer is within ±3.0 ppm/° C. the coefficient of thermal expansion of the substrate.

16. An article according to claim 1 wherein the coefficient of thermal expansion of the barrier layer is within ±0.5 ppm/°C. the coefficient of thermal expansion of the substrate.

17. An article according to claim 1 wherein the barrier layer has a thickness of ≧0.1 mils.

18. An article according to claim 1 including an intermediate layer between the substrate and the barrier layer.

19. An article according to claim 18 wherein said intermediate layer is selected from the group consisting of $SiO_2$, mullite, mullite-barium strontium aluminosilicate, mullite-yttrium silicate, mullite-calcium aluminosilicate, and silicon metal.

20. An article according to claim 19 wherein the intermediate layer contains an oxide of Ta, Nb and mixtures thereof.

21. An article according to claim 18 including a bond layer between the substrate and the intermediate layer.

22. An article according to claim 21 wherein the bond layer is silicon metal or $SiO_2$.

23. An article according to claim 21 wherein one of the bond layers and intermediate layers contains an oxide of Ta, Nb and mixtures thereof.

24. An article according to claim 21 wherein the barrier layer contains a CTE tailoring additive.

25. An article according to claim 21 wherein the CTE tailoring additive is $NbO_x$ where x=1 to 3.

26. An article according to claim 18 wherein the intermediate layer contains an oxide of Ta, Nb and mixtures thereof.

27. An article according to claim 16 wherein the barrier layer contains a CTE tailoring additive.

28. An article according to claim 21 wherein the CTE tailoring additive is $NbO_x$ where x=1 to 3.

29. An article according to claim 1 wherein the barrier layer contains a CTE tailoring additive.

30. An article according to claim 29 wherein the CTE tailoring additive is $NbO_x$ where x=1 to 3.

31. An article according to claim 1 wherein the oxide of the barrier layer comprises an oxide of Ta.

* * * * *